Inventor
Karl Stief

Patented Oct. 26, 1937

2,096,984

UNITED STATES PATENT OFFICE 2,096,984

TRIMMING FOR ROOFS

Karl Stief, Russelsheim-on-the-Main, Germany, assignor to General Motors Corporation, Detroit, Mich., a corporation of Delaware Application September 8, 1934, Serial No. 743,199½. In Germany October 23, 1933

3 Claims. (Cl. 296—137)

The invention relates to a lined metallic roof for motor vehicles.

In the past a lining or inner covering for metal roofs of motor vehicles has been applied with difficulty. Hitherto it has usually been necessary to arrange special support beams or arched members on the sheet metal roof and to attach the inner covering to the roof in some way. Where the roof construction required the presence of roof arches, these arches have been used for the fastening of the inner covering. In such cases it has been possible to dispense with at least part of the auxiliary structures hitherto used for applying the inner covering, but it has never been possible to fasten the covering material in a simple manner. Moreover, the spacing between the metal roof and the inner covering reduced the head room in the vehicle.

The object of the invention is to eliminate these objectionable characteristics and to provide in a simple way a metal roof with an inner covering in which no space is lost to reduce the head room.

According to the invention, the metal vehicle roof is formed without roof arches. To the inner side of the roof a layer of a sound-damping mass, for example, cork, paper pulp, felt, rubber or the like, is applied by gluing or spraying, after which the covering material is secured or glued to the insulating layer. The roof produced in this manner consists of three layers adhesively connected to each other, namely, an outer layer of sheet metal, an intermediate insulating layer, and an inner lining or covering. The insulating layer acts as a sound damper and prevents the transmission of heat.

At the edges of the roof there is usually a surrounding wooden moulding or frame for joining the roof with the sides of the vehicle. The material of the inner roof covering may be attached to the mouldings either by gluing or by means of nails. The covering may, however, be glued at its edge directly to the sheet metal of the roof or to the insulating layer. In this case it is recommended that a wooden moulding be used to cover the edge of the lining.

A roof formed in accordance with the invention offers the advantage of ease of manufacture, better utilization of space because of the elimination of unnecessary spacing inside the vehicle, and finally a very good appearance because the covering in all places adheres smoothly and no unsightly seams are visible.

In the construction of the roof the insulating substance forming the intermediate layer may itself be an adhesive mass which will adhere when it is sprayed on the sheet metal of the roof and which at the same time will serve as an adhesive for attaching the inner roof covering. As suitable insulating substances, there may be used rubber solutions mixed with other comminuted or powdered insulating substances, for example, a solution of a mixture of cork and rubber. It is also within the scope of the invention to use rubber, and particularly crude rubber (latex) with sufficient adhesive power.

A constructional form of the invention is shown by way of example in the drawing.

The numeral 1 indicates a vehicle body as a whole. The body has the usual doors 2 and 3 having the windows 4 and 5. The rear window is indicated at 6, while 7 designates the usual cowl, and 8 the windshield. The rear wheel housing is shown at 9.

Figure 1:
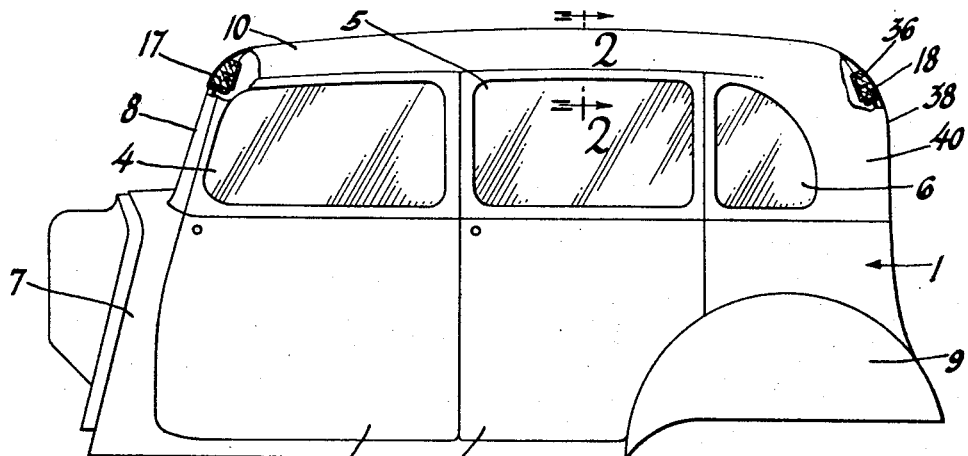
Figure 1 is a side elevational view of a vehicle body with parts shown in section.
Figure 2:
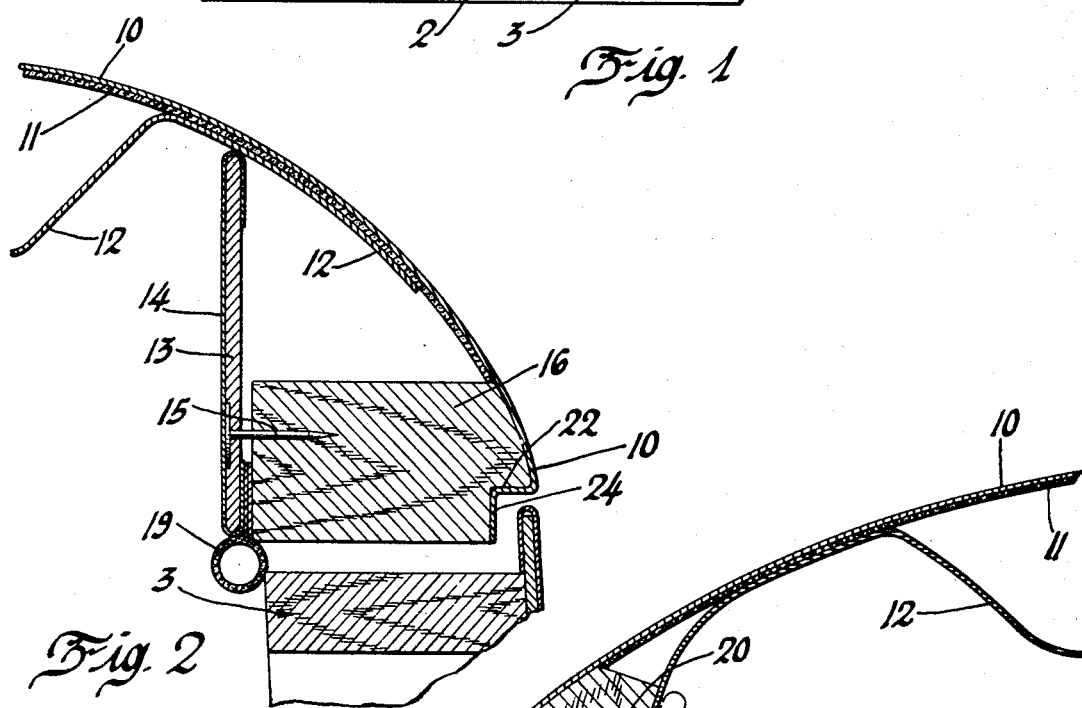
Figure 2 is a sectional view along line 2—2 of Figure 1.
Figure 3:
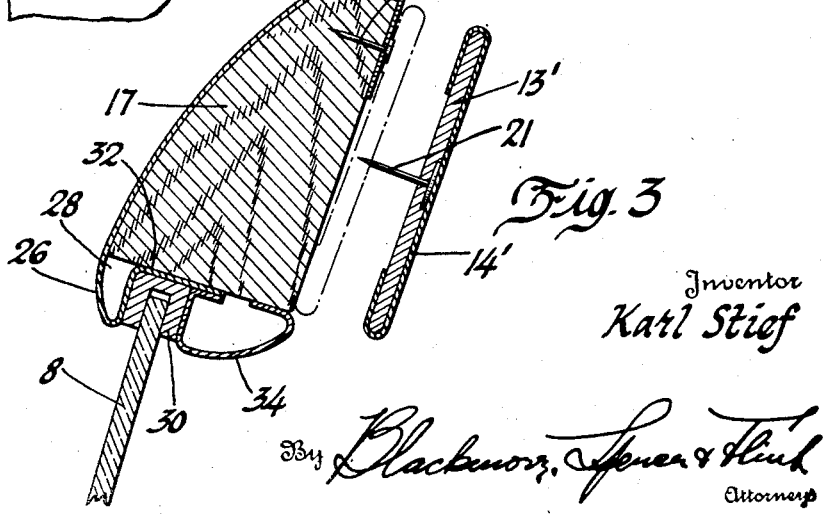
Figure 3 is an enlarged sectional view of the sectioned part at the left end of Figure 1 with the molding covering removed and shown in dotted lines better to illustrate the structure.

The roof body is formed of a pressed metal sheet 10. Along the lateral edges of the roof the wooden side rail or moulding 16 is arranged and at the vehicle front this mounting merges into the transverse wooden header rail or moulding 17 of somewhat different shape, and at the rear it merges into the transverse moulding 18. To the inside of the roof 10 the insulating layer 11 is applied, for example, by gluing or spraying and to this layer 11 the inner roof lining or covering 12 adheres. As shown in Figures 2 and 3, the covering material 12 is stuck fast in the vicinity of the wooden mouldings 16 and 17 only, while the remaining part of the covering material is shown as unattached.

At the roof sides (as shown in Figure 2) the covering material has its edge attached to the insulation layer 11. In order to cover the edge and to make a neat appearance, there is used a covering moulding 13 which may be of veneer, cardboard, metal or any other suitable material. This moulding 13 is coated with a substance 14 or covered with a fabric, or another material, to improve its appearance. If desired, the fabric may be glued to the moulding. The covering moulding itself is nailed to the roof rail 16 by means of nails 15 and has its upper edge in contact with the inner covering 12 and may rest yieldingly against the same. The usual intermediate member 19 may be employed for covering the crack between the roof and the side of the vehicle.

Referring to Figure 3, the edge of the inner roof covering is not attached to the insulating material 11, but to the roof edge moulding 17 by means of nails 20, in the manner indicated. The nails as well as the wooden moulding 17 are covered by the covering moulding 13' which is nailed to the roof edge moulding 17 by the nails 21. The moulding 13' has a covering 14' similiar to the covering 14.

As shown in Figure 2, the roof edge moulding 16 has a rabbet 22 into which the roof edge is bent or formed as shown at 24.

In Figure 3, the roof edge 26 is bent to form a channel 28 which serves as one wall to support the windshield guide channel 30. The roof edge 26 beyond the channel is inturned as at 32 and forms the bottom of the channel in which the windshield guide channel 30 rests. A metal moulding 34 is applied at the inside of the vehicle to form the other supporting wall for the guide channel 30.

At its rear end 36 the roof 10 may merge with the rear and side quarter panels 38 and 40 respectively.

The best known art is French 680,158 Warschauer, 1,512,012 Becher, 1,664,114 Kelley.

I claim:

1. A vehicle roof comprising a metal sheet the interior surface of which is without substantial projections and extends substantially smoothly between the edge portions of the roof, a layer of plastic material adhering to the entire interior surface of said metal sheet between said edge portions of the roof, and an interior lining adhering to and underlying said layer, said layer constituting a sound-damping and heat-insulating means and said material including rubber in a form having sufficient adhesive properties to secure said layer to said metal sheet.

2. A vehicle roof comprising a metal sheet the interior surface of which is without substantial projections and extends substantially smoothly between the edge portions of the roof, a layer of plastic material adhering to the entire interior surface of said metal sheet between said edge portions of the roof, and an interior lining adhering to and underlying said layer, said material consisting of rubber solution mixed with comminuted insulating substances and said layer constituting a sound-damping and heat-insulating means.

3. A vehicle roof comprising a metal sheet the interior surface of which is without substantial projections and extends substantially smoothly between the edge portions of the roof, a layer of plastic material adhering to the entire interior surface of said metal sheet between said edge portions of the roof, and an interior lining adhering to and underlying said layer, said material including rubber latex and said layer constituting a sound-damping and heat-insulating means.

KARL STIEF.